(12) United States Patent
Miyoshi et al.

(10) Patent No.: US 7,050,488 B2
(45) Date of Patent: *May 23, 2006

(54) COMMUNICATION TERMINAL APPARATUS AND BASE STATION APPARATUS

(75) Inventors: Kenichi Miyoshi, Yokohama (JP); Katsuhiko Hiramatsu, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/902,580

(22) Filed: Jul. 30, 2004

(65) Prior Publication Data

US 2005/0002358 A1 Jan. 6, 2005

Related U.S. Application Data

(63) Continuation of application No. 10/070,459, filed as application No. PCT/JP01/06284 on Jul. 19, 2001, now Pat. No. 6,788,737.

(30) Foreign Application Priority Data

Jul. 26, 2000 (JP) .............................. 2000-225171

(51) Int. Cl.
*H04B 1/38* (2006.01)
(52) U.S. Cl. ...................... 375/219; 375/377; 375/222; 375/224; 455/437; 455/441
(58) Field of Classification Search ................ 375/219, 375/222, 224, 377; 455/441, 437
See application file for complete search history.

(56) References Cited

U.S. PATENT DOCUMENTS 5,577,087 A * 11/1996 Furuya ....................... 375/377

| | | | | |
|---|---|---|---|---|
| 5,884,178 A * | 3/1999 | Ericsson et al. | ............. | 455/441 |
| 5,914,959 A | 6/1999 | Marchetto et al. | .......... | 370/468 |
| 6,341,224 B1 | 1/2002 | Dohi et al. | ................. | 455/522 |
| 6,389,066 B1 | 5/2002 | Ejzak | ......................... | 375/224 |
| 6,452,964 B1 | 9/2002 | Yoshida | ..................... | 375/222 |
| 6,507,827 B1 | 1/2003 | Benson, Jr. | .................. | 706/14 |
| 6,594,494 B1 * | 7/2003 | Kakehi | ...................... | 455/437 |
| 6,788,737 B1 * | 9/2004 | Miyoshi et al. | ............. | 375/219 |

FOREIGN PATENT DOCUMENTS

JP 06242225 9/1994

(Continued)

OTHER PUBLICATIONS

"HDR Air Interface Physical Layer", Qualcomm Incorporated, Mar. 28, 2000.

(Continued)

*Primary Examiner*—Chieh M. Fan
*Assistant Examiner*—Eva Zheng
(74) *Attorney, Agent, or Firm*—Stevens, Davis, Miller & Mosher, LLP (57) ABSTRACT

PL demodulation section 203 demodulates pilot signals of a received signal. SIR detection section 205 detects the reception quality of the demodulated pilot signals. fd detection section 206 detects a Doppler frequency using the demodulated pilot signals. Requested modulation method deciding section 207 decides a modulation method to be requested to the base station using the reception quality of pilot signals and the detected Doppler frequency. Command generation section 208 generates a command corresponding to the decided modulation method. Adaptive demodulation section 204 performs demodulation processing on the received signal using the demodulation method corresponding to the modulation method decided by requested modulation method deciding section 207. This makes it possible to maintain good reception quality even in a fading environment.

2 Claims, 9 Drawing Sheets

FOREIGN PATENT DOCUMENTS

| | | |
|---|---|---|
| JP | 07250116 | 9/1995 |
| JP | 09200282 | 7/1997 |
| JP | 10041876 | 2/1998 |
| JP | 10056420 | 2/1998 |
| JP | 10093650 | 4/1998 |
| JP | 10247955 | 9/1998 |
| JP | 11220774 | 8/1999 |
| JP | 11331936 | 11/1999 |
| WO | 9750197 | 12/1997 |

OTHER PUBLICATIONS

"High Speed Downlink Packet Access", Motorola Network Solutions Sector.

* cited by examiner

PRIOR ART

COMMUNICATION TERMINAL APPARATUS AND BASE STATION APPARATUS

This is a continuation application of application Ser. No. 10/070,459, filed Mar. 7, 2002 (now U.S. Pat. No. 6,788,737 which is an application under 35 USC 371 of PCT/JP01/06284 filed Jul. 19, 2001 and which claims priority on Japanese Patent Application 2000-225171 filed Jul. 26, 2000).

TECHNICAL FIELD

The present invention relates to an adaptive modulation method used in a digital mobile unit communication system.

BACKGROUND ART

Figure 1:
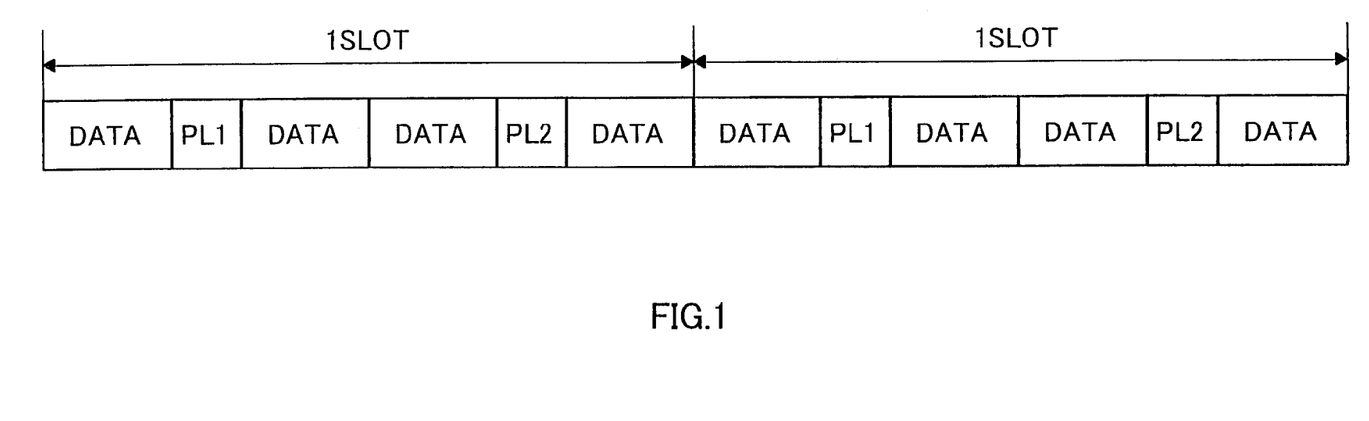
FIG. 1 is a schematic view showing a downlink slot format used for a communication using an HDR.

For a digital mobile unit communication system, there are proposals about an adaptive modulation method such as HDR (High Data Rate) in recent years. A communication using a conventional HDR will be explained with reference to FIG. 1 below. FIG. 1 is a schematic view showing a downlink slot format used for communications using an HDR.

First, a communication terminal apparatus demodulates pilot (PL1 and PL2) sections of a received signal and detects an SIR. The communication terminal apparatus then decides a modulation method that allows the reception quality of data sections to satisfy a required quality based on the detected SIR and decides the modulation method to be requested to a base station apparatus.

Figure 2:
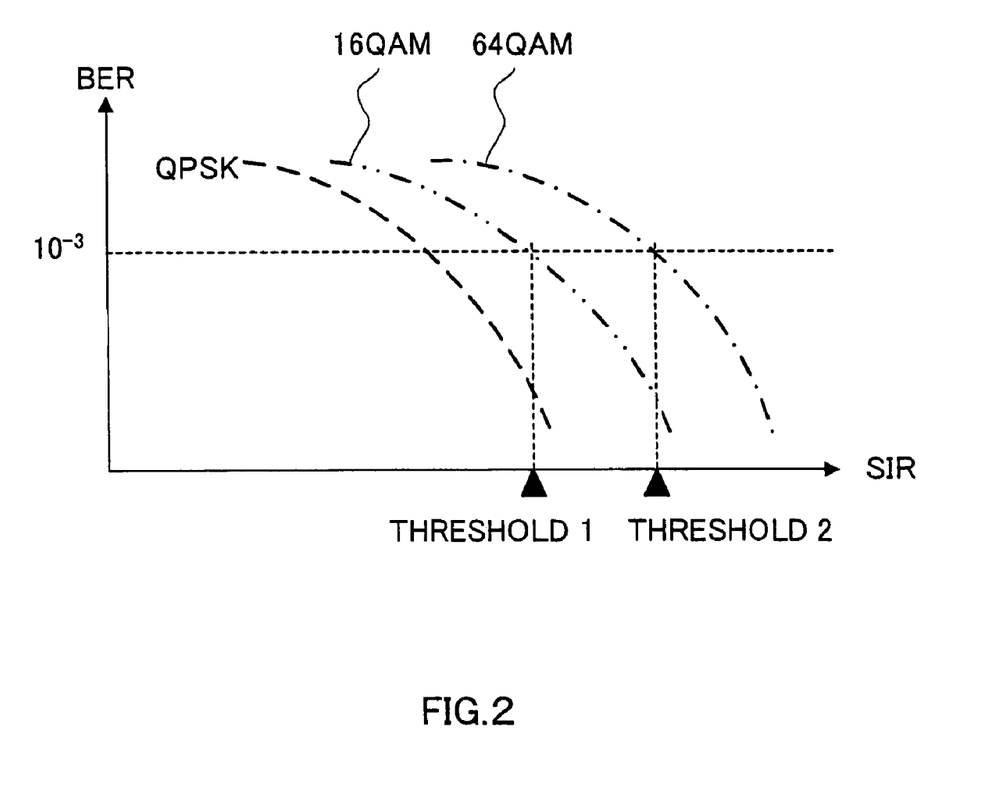
FIG. 2 is a schematic view showing a method of deciding a modulation method in a communication using a conventional HDR.

A specific example of a method of deciding the modulation method will be explained with reference to FIG. 2. FIG. 2 is a schematic view showing a method of deciding a modulation method in a communication using a conventional HDR.

In FIG. 2, when the SIR of a pilot section is lower than threshold 1, even if the communication terminal apparatus receives data to which 16 QAM or 64 QAM is applied, the reception quality of the data section does not satisfy a desired BER ($10^{-3}$). Therefore, the communication terminal apparatus selects QPSK as the modulation method to be requested to the base station apparatus.

Furthermore, when the SIR of the pilot section is between threshold 1 and threshold 2, even if the communication terminal apparatus receives data to which 16 QAM is applied, the reception quality of the data section can satisfy the desired BER. Thus, the communication terminal apparatus selects 16 QAM as the modulation method to be requested to the base station apparatus. Furthermore, when the SIR of the pilot section is higher than threshold 2, even if the communication terminal apparatus receives data to which 64 QAM is applied, the reception quality of the data section can satisfy the desired BER. Thus, the communication terminal apparatus selects 64 QAM as the modulation method to be requested to the base station apparatus. These are specific examples of the method of deciding the modulation method.

Then, the communication terminal apparatus notifies the decided modulation method to the base station apparatus.

On the other hand, the base station apparatus performs scheduling based on the modulation method notified from each communication terminal apparatus and sends data to which the modulation method notified from this communication terminal apparatus is applied to the communication terminal apparatus decided by the scheduling.

However, movements of a communication terminal apparatus cause fading in a mobile unit communication system. In a fading environment, even if there is no change in the reception quality of a pilot section (pilot signal), a Doppler frequency of fading (fd) may cause the reception quality of the data section (received data) to deteriorate, which results in a large difference between the reception quality of the pilot section and the reception quality of the data section.

More specifically, since the time zone occupied by a pilot section in a slot is short as is apparent from FIG. 1, the reception quality of the pilot section in the communication terminal apparatus is favorable even in a fading environment. On the other hand, since the time zone occupied by a data section in a slot is long, in a fading environment, a phase rotation occurs in the data section received by the communication terminal apparatus due to the fading. This causes the reception quality of the data section in the communication terminal apparatus to deteriorate, which results in a large difference between the reception quality of the pilot section and the reception quality of the data section (that is, the reception quality of the data section falls below the reception quality of the pilot section in a fading environment).

As a result, when the communication terminal apparatus decides a modulation method to be requested to the base station apparatus based on the reception quality measured in pilot section, the reception quality of the data section in the communication terminal apparatus fails to satisfy the required quality.

As shown above, the conventional adaptive modulation method has a problem that the quality of received data in a communication terminal apparatus falls below the desired quality in a fading environment, having difficulty in performing highly efficient and high quality data communications.

DISCLOSURE OF INVENTION

It is an object of the present invention to provide a communication terminal apparatus capable of maintaining favorable reception quality even in a fading environment.

This object is attained by deciding a modulation method applied to an information signal based on the reception quality of a known reference signal and a Doppler frequency.

BEST MODE FOR CARRYING OUT THE INVENTION

With reference now to the attached drawings, embodiments of the present invention will be explained in detail below.

EMBODIMENT 1

Figure 3:
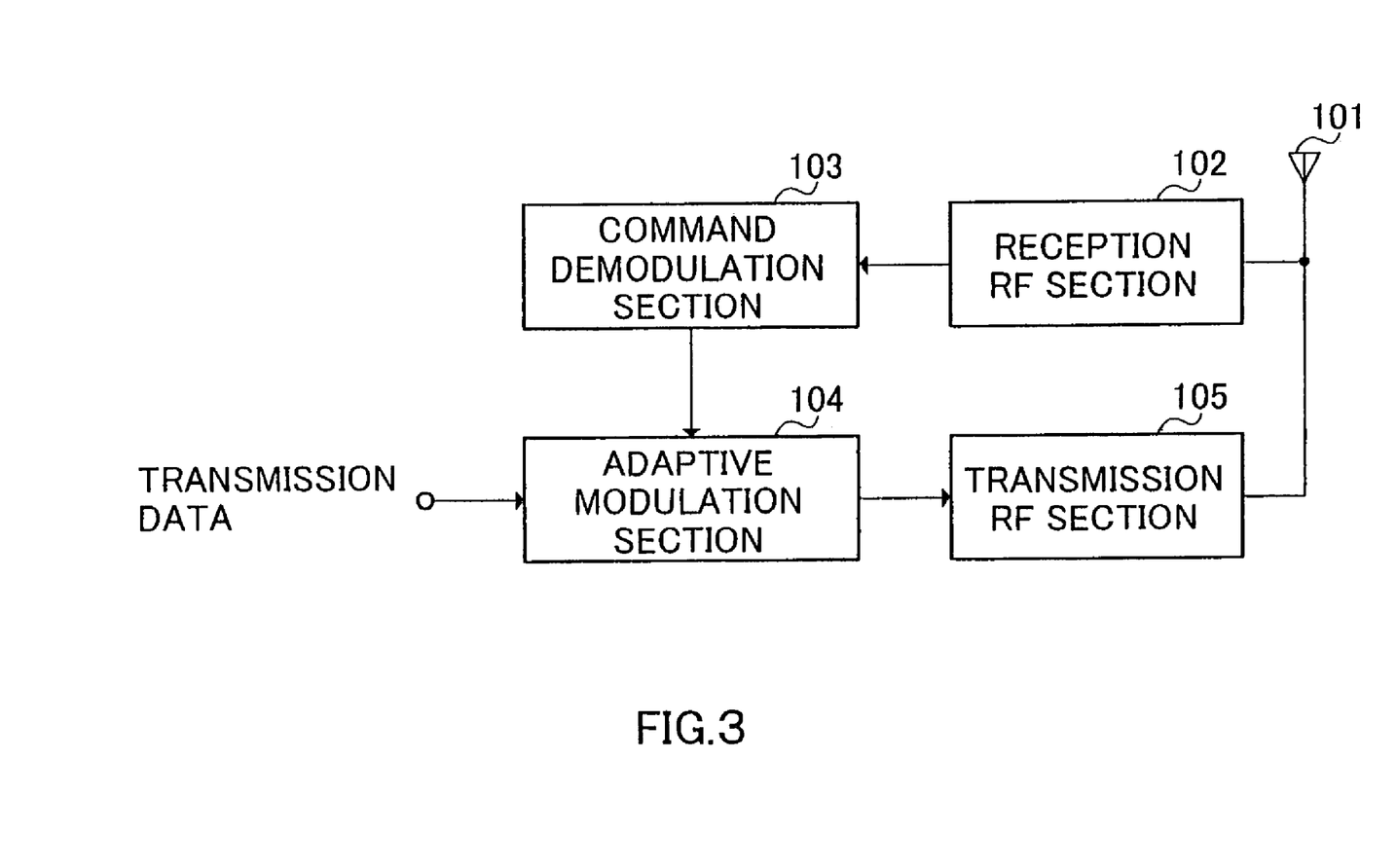
FIG. 3 is a block diagram showing a configuration of a base station apparatus according to Embodiment 1 of the present invention.

This embodiment will describe a case where a modulation method is decided based on a Doppler frequency detected by a communication terminal apparatus. FIG. 3 is a block diagram showing a configuration of a base station apparatus according to Embodiment 1 of the present invention. Suppose the base station apparatus shown in FIG. 3 performs transmission to a communication terminal apparatus using the slot format shown in FIG. 1, for example.

In FIG. 3, reception RF section 102 performs predetermined radio reception processing such as frequency conversion on a signal received via antenna 101 (received signal). Command demodulation section 103 demodulates a command sent from the communication terminal apparatus by applying demodulation processing to the received signal subjected to the radio reception processing. Adaptive modulation section 104 applies adaptive modulation to transmission data using the modulation method decided according to the command demodulated by command demodulation section 103. Transmission RF section 105 generates a transmission signal by time-multiplexing pilot signals (pilot signal 1 "PL1" and pilot signal 2 "PL2") subjected to predetermined modulation and transmission data subjected to adaptive modulation, applies predetermined radio transmission processing such as frequency conversion to the transmission signal generated and sends the transmission signal subjected to the radio transmission processing via antenna 101.

Figure 4:
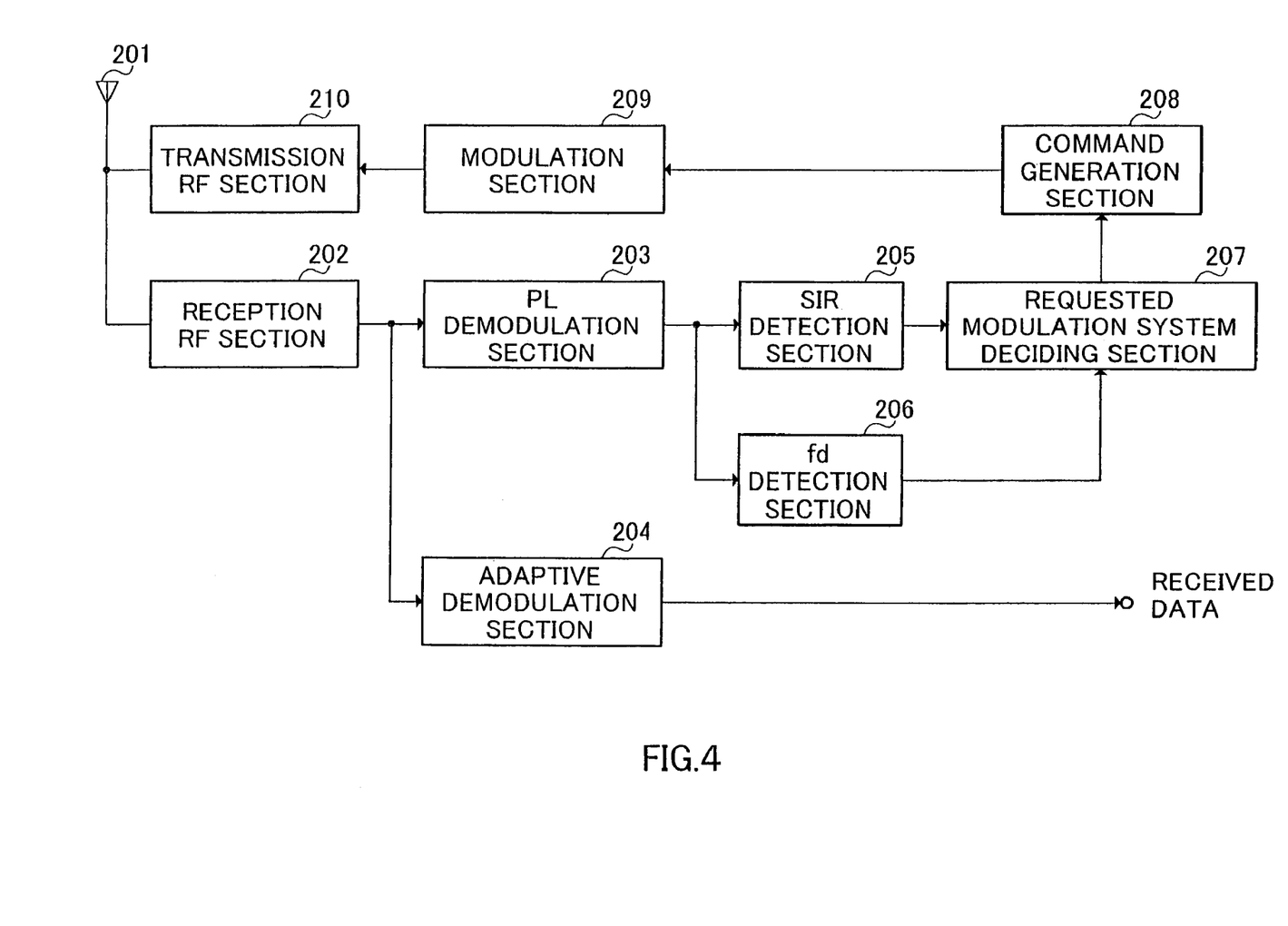
FIG. 4 is a block diagram showing a configuration of a communication terminal apparatus according to Embodiment 1 above.

FIG. 4 is a block diagram showing a configuration of a communication terminal apparatus according to Embodiment 1 of the present invention. In FIG. 4, reception RF section 202 applies predetermined radio reception processing such as frequency conversion to a signal received via antenna 201 (received signal).

Adaptive demodulation section 204 demodulates data sections using the received signal subjected to the radio reception processing. PL demodulation section 203 demodulates pilot signals using the received signal subjected to the radio reception processing. SIR detection section 205 detects reception quality (e.g., SIR) using the pilot signals demodulated by PL demodulation section 203. fd detection section 206 detects fd (Doppler frequency) using the pilot signals demodulated by PL demodulation section 203.

Requested modulation method deciding section 207 decides a modulation method (e.g., QPSK, 16 QAM, 64 QAM) to be requested to the base station apparatus using the reception quality of the pilot signals detected by SIR detection section 205 and the fd detected by fd detection section 206. The method of deciding the modulation method will be described later.

Command generation section 208 generates a command corresponding to the modulation method decided by requested modulation method deciding section 207. Modulation section 209 modulates the command generated by command generation section 208. Transmission RF section 210 applies predetermined radio transmission processing such as frequency conversion to the command modulated by modulation section 209 and sends the command subjected to the radio transmission processing via antenna 201.

Figure 5:
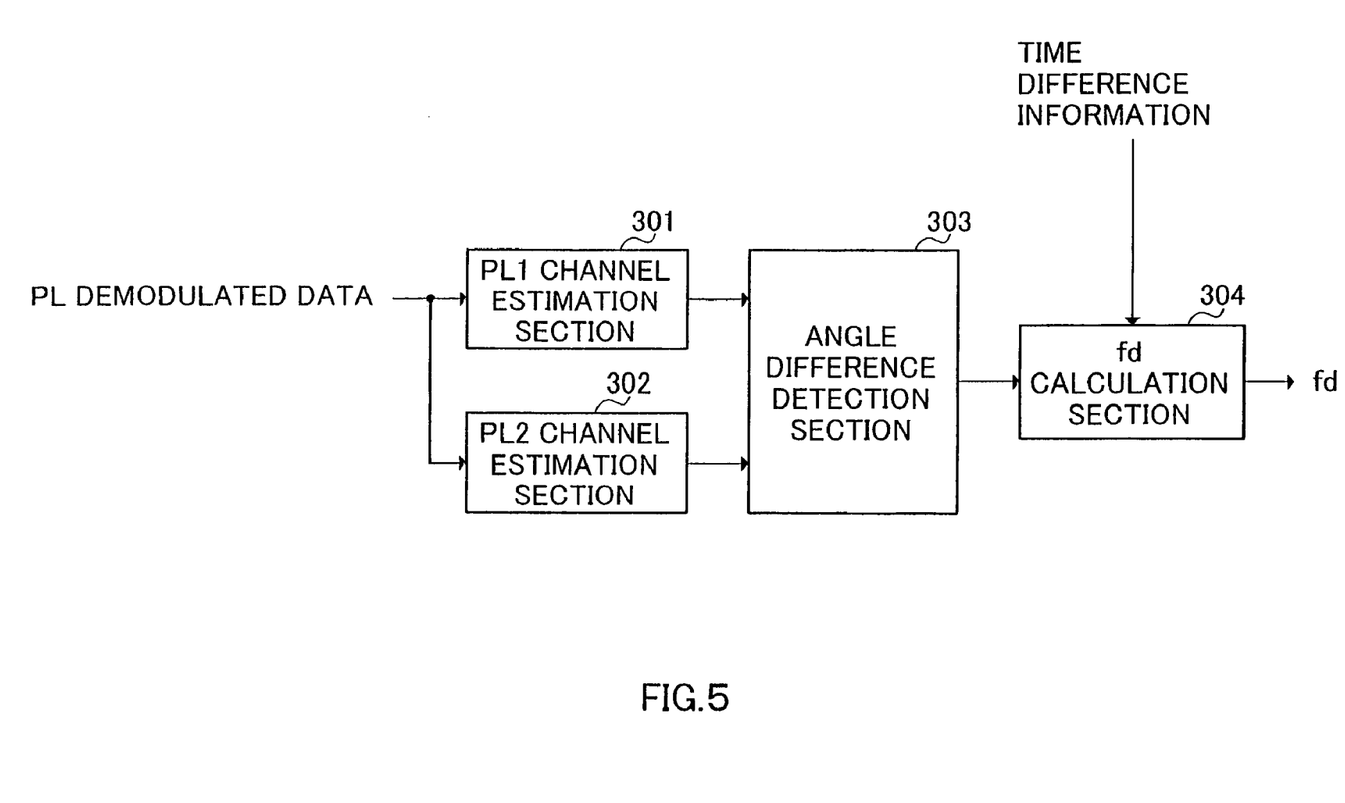
FIG. 5 is a block diagram showing a configuration of an fd detection section in the communication terminal apparatus according to Embodiment 1 above.

FIG. 5 is a block diagram showing a configuration of fd detection section 206 in the communication terminal apparatus according to Embodiment 1 of the present invention. In FIG. 5, of the pilot signals demodulated by PL demodulation section 203, "PL1" is output to PL1 channel estimation section 301 and "PL2" is output to PL2 channel estimation section 302.

PL1 channel estimation section 301 performs channel estimation on demodulated "PL1". PL2 channel estimation section 302 performs channel estimation on demodulated "PL2".

Angle difference detection section 303 calculates angle difference $\theta$ between both channel estimation results using the channel estimation result from PL1 channel estimation section 301 and the channel estimation result from PL2 channel estimation section 302.

fd calculation section 304 is fed information indicating a time difference (hereinafter referred to as "time difference information") between "PL1" and "PL2" in the slot frame shown in FIG. 1. This fd calculation section 304 detects a Doppler frequency using the time difference information and angle difference $\theta$ from angle difference detection section 303.

Then, operations of the communication terminal apparatus and the base station apparatus having the above-described configurations will be explained. First, in the base station apparatus shown in FIG. 3, transmission RF section 105 generates a transmission signal by time-multiplexing pilot signals ("PL1" and "PL2") subjected to predetermined modulation and transmission data subjected to adaptive modulation as shown in FIG. 1. The transmission data subjected to adaptive modulation will be described in further detail later. The transmission signal generated is subjected to predetermined radio transmission processing and sent via antenna 101.

The signal sent from the base station apparatus is received by the communication terminal apparatus shown in FIG. 4 via antenna 201. In FIG. 4, the signal received via antenna 201 (received signal) is subjected to predetermined radio reception processing by reception RF section 202. The signals corresponding to the data sections (see FIG. 1) of the received signal subjected to the radio reception processing are output to adaptive demodulation section 204, while the signals corresponding to the pilot signals of the received signal subjected to the radio reception processing are output to PL demodulation section 203.

PL demodulation section 203 performs demodulation processing on the received signal from reception RF section 202. In this way, pilot signal 1 "PL1" and pilot signal 2 "PL2" are demodulated. Demodulated "PL1" and "PL2" are output to SIR detection section 205 and fd detection section 206.

Figure 6:
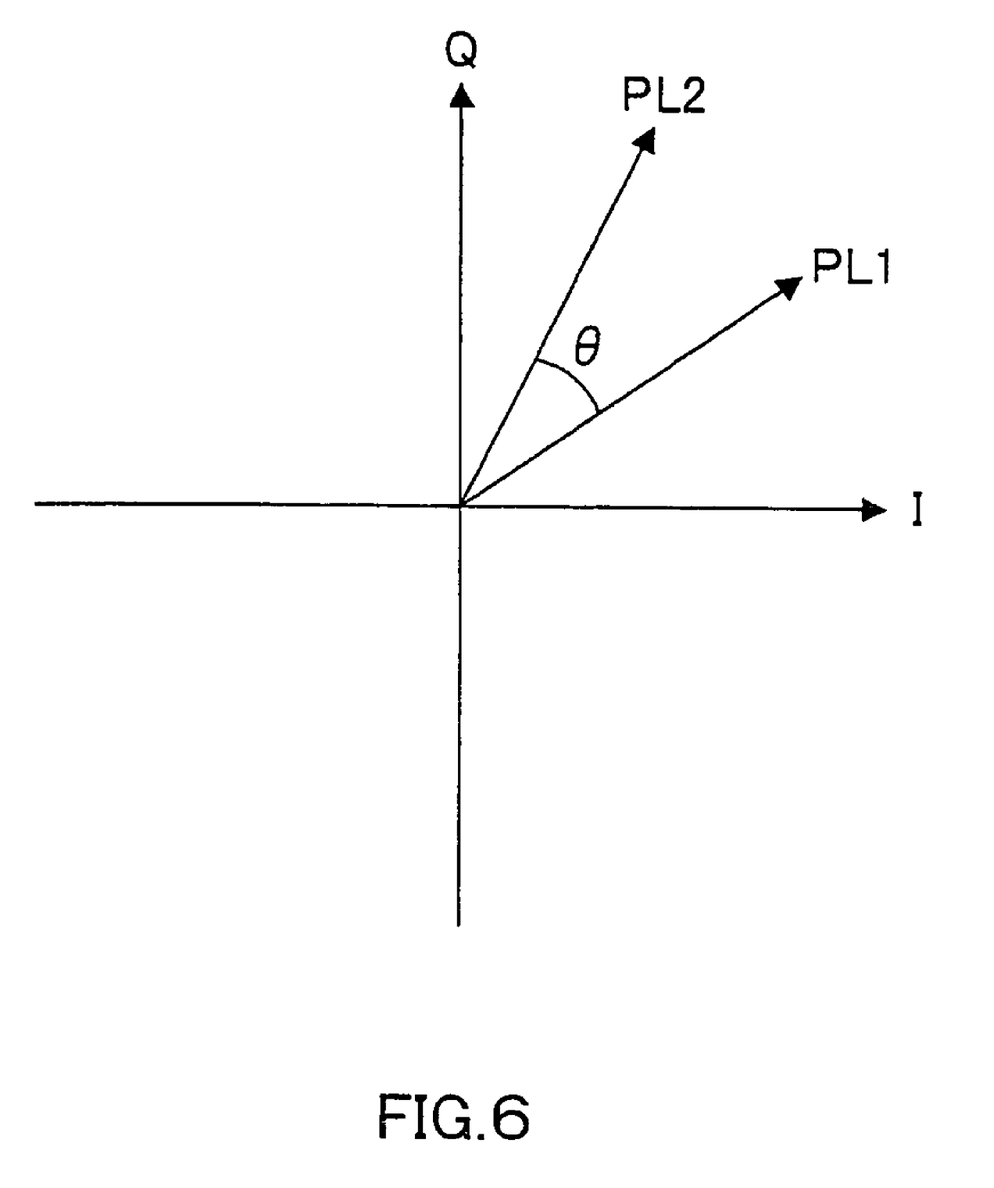
FIG. 6 is a schematic view showing a method of detecting an fd by the fd detection section in the communication terminal apparatus according to Embodiment 1 above.

SIR detection section 205 detects the reception quality using "PL1" and "PL2" demodulated by PL demodulation section 203. The reception quality detected is output to requested modulation method deciding section 207.

fd detection section 206 detects an fd (Doppler frequency) using "PL1" and "PL2" demodulated by PL demodulation section 203. A specific example of fd detection will be explained with reference to FIG. 5 and FIG. 6. FIG. 6 is a schematic view showing a method of detecting an fd by fd detection section 206 in the communication terminal apparatus according to Embodiment 1 of the present invention.

According to FIG. 5, "PL1" demodulated by PL demodulation section 203 is input to PL1 channel estimation section 301 and "PL2" demodulated by PL demodulation section 203 is input to PL2 channel estimation section 302.

PL1 channel estimation section 301 performs channel estimation on demodulated "PL1". PL2 channel estimation section 302 performs channel estimation on demodulated "PL2". The channel estimation results by PL1 channel estimation section 301 and PL2 channel estimation section 302 are output to angle difference detection section 303.

Angle difference detection section 303 calculates angle difference θ between the "PL1" channel estimation result and the "PL2" channel estimation result as shown in FIG. 4. The calculated angle difference θ is output to fd calculation section 304.

fd calculation section 304 detects a fading variation using angle difference θ calculated by angle difference detection section 303 and time difference information and calculates a Doppler frequency (fd). The calculated fd is output to requested modulation method deciding section 207.

Requested modulation method deciding section 207 decides a modulation method to be requested to the base station apparatus using the reception quality of the pilot signals detected by SIR detection section 205 and the fd detected by fd detection section 206. As the modulation method, the one which allows the reception quality of the data sections of this communication terminal apparatus to satisfy required quality and is fastest as well is decided. A specific method for deciding a requested modulation method will be further explained with reference to FIG. 7 below.

Figure 7:
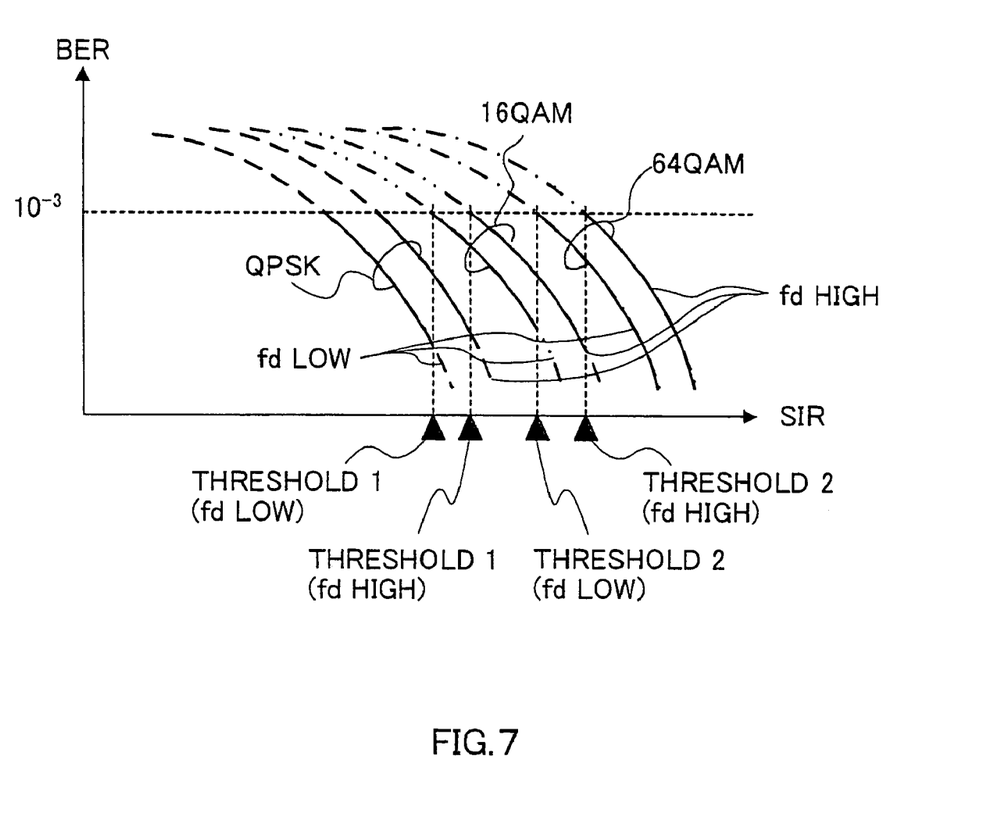
FIG. 7 is a schematic view showing an example of a method of deciding a modulation method at a requested modulation method deciding section in the communication terminal apparatus according to Embodiment 1 above.

FIG. 7 is a schematic view showing an example of a method of deciding a modulation method by requested modulation method deciding section 207 in the communication terminal apparatus according to Embodiment 1 of the present invention. FIG. 7 shows a relationship between the reception quality (SIR) of pilot signals and the quality of received data (error rate characteristics: BER) in the cases of, for example, a high fd and a low fd, respectively at the communication terminal apparatus when the base station apparatus applies a QPSK system, 16 QAM system and 64 QAM system to transmission data.

As is apparent from FIG. 7, there is a difference in the characteristic of received data in the cases of a high fd and low fd even if the communication terminal apparatus receives pilot signals with equal quality. That is, the characteristic of received data in the case of a high fd deteriorates compared to the characteristic of received data in the case of a low fd. Thus, when the fd changes, the characteristic of received data changes a great deal even if the reception quality of pilot signals remains unchanged.

Thus, this embodiment decides a modulation method using thresholds provided according to fd. That is, this embodiment provides threshold 1 and threshold 2 for a high fd and low fd, respectively.

When fd is high, in the case where the reception quality of a pilot signal is lower than threshold 1 (high fd), a QPSK modulation method is selected, when the reception quality of a pilot signal is between threshold 1 (high fd) and threshold 2 (high fd), a 16 QAM modulation method is selected and when the reception quality of a pilot signal is higher than threshold 2 (high fd), a 64 QAM modulation method is selected. On the contrary, in the case where fd is low, when the reception quality of a pilot signal is lower than threshold 1 (low fd), a QPSK modulation method is selected, when the reception quality of a pilot signal is between threshold 1 (low fd) and threshold 2 (low fd), a 16 QAM modulation method is selected and when the reception quality of a pilot signal is higher than threshold 2 (low fd), a 64 QAM modulation method is selected.

Here, the above-described thresholds can be set as follows. That is, characteristics of received data (received data when QPSK, 16 QAM or 64 QAM, etc. is applied) with respect to the reception quality of pilot signals are obtained in the cases of a high fd and low fd respectively. Furthermore, the minimum required reception quality of pilot signals so that the characteristic of received data meets the desired quality when a 16 QAM modulation method is applied is set to threshold 1 and the minimum required reception quality of pilot signals so that the characteristic of received data meets the desired quality when a 64 QAM modulation method is applied is set to threshold 2 in the cases of a high fd and low fd respectively.

This embodiment has described the case where the modulation method is decided according to the cases of a high fd and low fd respectively, but the present invention is also applicable to a case where the modulation method is decided according to fd of three or more types. Thresholds can be set using the above-described method in such a case, too.

Selecting a modulation method in this way is equivalent to selecting the modulation method by estimating characteristic differences between pilot signals and received data using the detected Doppler frequency and taking into account these characteristic differences. This is a specific method of deciding the modulation method by requested modulation method deciding section 207.

The modulation method decided in this way is notified to command generation section 208. Command generation section 208 generates a command corresponding to the modulation method decided by requested modulation method deciding section 207. The command generated by command generation section 208 is modulated by modulation section 209, subjected to predetermined radio transmission processing by transmission RF section 210 and then sent via antenna 201. An operation of adaptive modulation section 204 will be described later.

A signal sent from the communication terminal apparatus is received by the base station apparatus shown in FIG. 1 via antenna 101. In FIG. 1, the signal received via antenna 101 (received signal) is subjected to predetermined radio reception processing by reception RF section 102. The received signal subjected to radio reception processing is demodulated by command demodulation section 103. The command sent from the communication terminal apparatus is demodulated in this way. The demodulated command is output to adaptive modulation section 104.

Adaptive modulation section 104, performs adaptive modulation on the data to be transmitted to the communication terminal apparatus using the modulation method decided according to the command from command demodulation section 103. The transmission data subjected to adaptive modulation is output to transmission RF section 105. Hereafter, as described above, transmission RF section 105 time-multiplexes pilot signals subjected to predetermined modulation and transmission data subjected to adaptive modulation to generate a transmission signal, performs predetermined radio transmission processing on the transmission signal generated and transmits the signal via antenna 101.

The signal transmitted from the base station apparatus is received by the communication terminal apparatus shown in FIG. 2 via antenna 201 as described above. As shown above, of the received signal subjected to radio reception processing by reception RF section 202, signals corresponding to the data sections (see FIG. 1) are output to adaptive demodulation section 204, while of the received signal subjected to radio reception processing, signals corresponding to pilot signals are output to PL demodulation section 203. The operation of PL demodulation section 203 is as described above.

Adaptive demodulation section 204 performs demodulation processing on the received signal subjected to radio reception processing by reception RF section 202 according to the demodulation method corresponding to the modulation method used by adaptive modulation section 104 at the base station apparatus shown in FIG. 3. Received data is obtained in this way.

Thus, this embodiment detects a Doppler frequency using pilot signals, estimates the reception quality of the received data in a fading environment using the detected Doppler frequency and the reception quality of the pilot signals and decides a modulation method to be requested to the base station apparatus based on the estimated reception quality of the received data. That is, this embodiment estimates characteristic differences between pilot signals and received data using the detected Doppler frequency and decides the modulation method to be requested to the base station apparatus taking into account these characteristic differences.

In this way, this embodiment can reliably decide the modulation method which is fastest and at the same time allows the quality of received data at the communication terminal apparatus to satisfy required quality even in a fading environment, and can thereby provide high quality and highly efficient data communications.

For the sake of simplicity, this embodiment has described the case, as an example, where one communication terminal apparatus decides a modulation method based on a Doppler frequency, notifies the decided modulation method to the base station apparatus and the base station apparatus sends transmission data obtained by applying the modulation method notified by this communication terminal apparatus to the communication terminal apparatus. However, the present invention is also applicable to cases where transmission data is sent to a plurality of communication terminal apparatuses.

That is, the present invention is also applicable to a case where a plurality of communication terminal apparatuses decides a modulation method likewise, notifies the decided modulation method to a base station apparatus, while the base station apparatus decides (schedules) the communication terminal apparatus that transmits data based on the modulation method notified from each communication terminal apparatus and sends the transmission data to the communication terminal apparatus according to the scheduling. In this case, it goes without saying that when the base station apparatus sends the transmission data to a communication terminal apparatus, the base station apparatus applies the modulation method notified by this communication terminal apparatus to the transmission data.

Furthermore, this embodiment has described the case, as an example, where a downlink slot format shown in FIG. 1 is used, but the present invention is not limited to this and the present invention can naturally apply any slot format other than the one shown in FIG. 1. More specifically, an applicable slot format corresponds to a slot format obtained by time-multiplexing data sections (sections for transmitting information signals) and pilot sections (sections for transmitting known reference signals). A time difference between pilot sections and the number of pilot sections per slot are not limited to particular ones as far as they allow detection of fd.

EMBODIMENT 2

This embodiment will describe a case where the base station apparatus detects a Doppler frequency using a received signal and decides a modulation method applicable to data to be transmitted to the communication terminal apparatus based on the detected Doppler frequency and a modulation method notified from the communication terminal apparatus.

In above-described Embodiment 1, the communication terminal apparatus detects fd. However, fd is only decided by the moving speed of the communication terminal apparatus, and therefore the base station apparatus detects fd of an uplink signal and can regard it as fd of a downlink signal. Thus, in this embodiment, it is not the communication terminal apparatus but the base station apparatus that detects fd.

Figure 8:
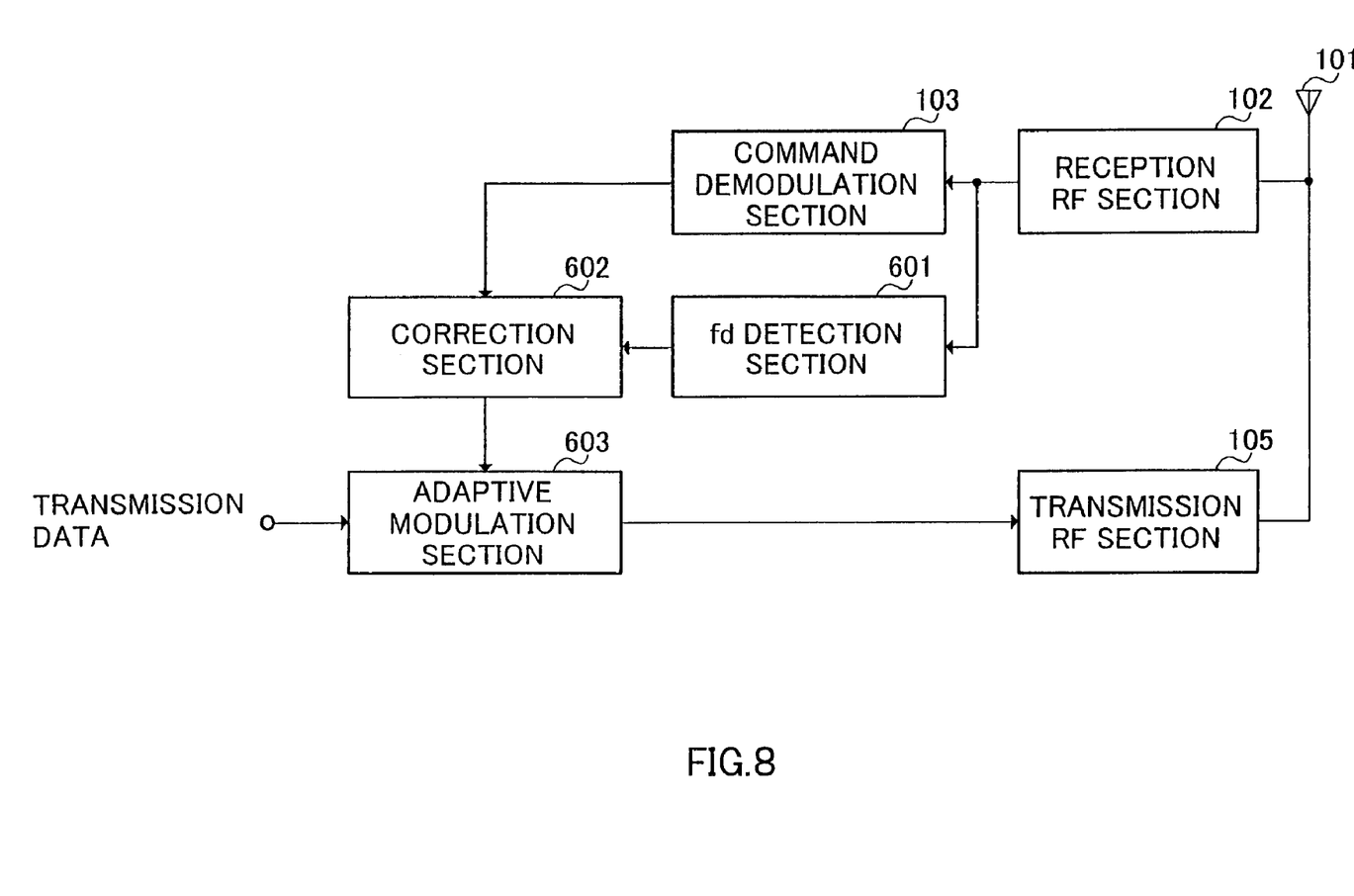
FIG. 8 is a block diagram showing a configuration of a base station apparatus according to Embodiment 2 of the present invention.

FIG. 8 is a block diagram showing a configuration of a base station apparatus according to Embodiment 2 of the present invention. The same components in FIG. 8 as those in Embodiment 1 (FIG. 3) are assigned the same reference numerals as those in FIG. 3 and detailed explanations thereof are omitted.

In FIG. 8, fd detection section 601 detects fd using a received signal subjected to radio reception processing from reception RF section 102. fd detection section 601 can use any signal sent from the communication terminal apparatus as a received signal to detect fd.

Correction section 602 recognizes the modulation method notified from the communication terminal apparatus using a command demodulated by command demodulation section 103 and decides a modulation method applicable to transmission data for the communication terminal apparatus using the recognized modulation method and the fd detected by fd detection section 601. Adaptive modulation section 603 performs adaptive modulation on the transmission data using the modulation method decided by correction section 602.

Figure 9:
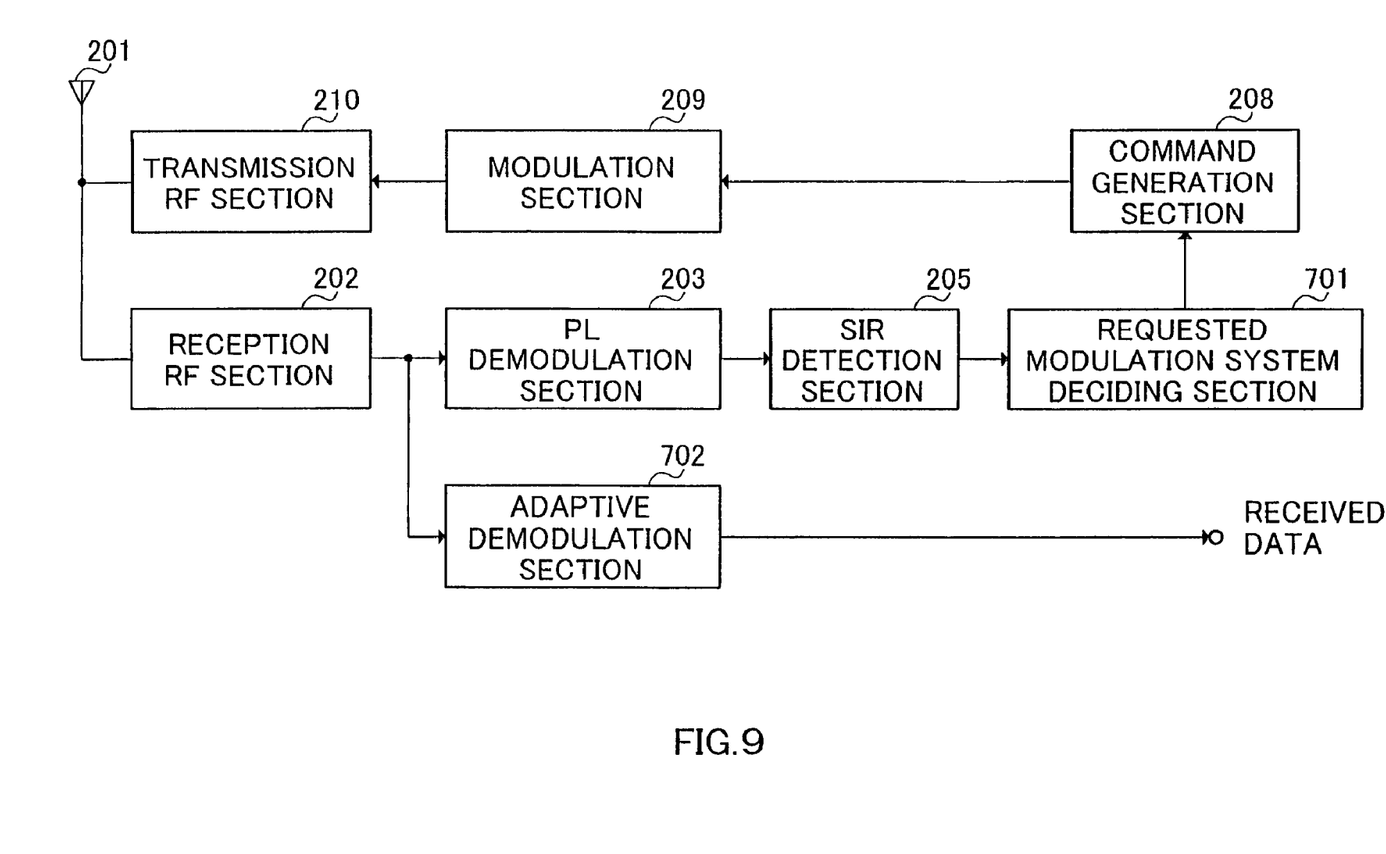
FIG. 9 is a block diagram showing a configuration of a communication terminal apparatus according to Embodiment 2 of the present invention.

FIG. 9 is a block diagram showing a configuration of a communication terminal apparatus according to Embodiment 2 of the present invention. The same components in FIG. 9 as those in Embodiment 1 (FIG. 4) are assigned the same reference numerals as those in FIG. 4 and detailed explanations thereof are omitted.

In FIG. 9, requested modulation method deciding section 701 decides a modulation method to be requested to the base station apparatus using the reception quality of pilot signals detected by SIR detection section 2.05.

Adaptive demodulation section 702 has a configuration similar to that of adaptive demodulation section 204 in Embodiment 1 (FIG. 4) except that adaptive demodulation section 702 performs demodulation processing using the demodulation method corresponding to the modulation method used for adaptive modulation section 603 in FIG. 8.

Then, operations of the communication terminal apparatus and base station apparatus having the above-described configurations will be explained. The same operations in this embodiment as those in Embodiment 1 are omitted. First, in the communication terminal apparatus shown in FIG. 9, requested modulation method deciding section 701 decides a modulation method to be requested to the base station apparatus using the reception quality of pilot signals detected by SIR detection section 205. As the modulation method, the one which allows the reception quality of data sections at this communication terminal apparatus to satisfy required quality and is fastest as well is decided. The decided modulation method is notified to command generation section 208 as described above.

Then, at the base station apparatus shown in FIG. 8, a received signal subjected to radio reception processing by reception RF section 102 is output to command demodulation section 103 and fd detection section 601. Command demodulation section 103 performs the processing explained in Embodiment 1 and demodulates the command sent from the communication terminal apparatus.

fd detection section 601 detects fd using the received signal subjected to radio reception processing. As a specific fd detection method, it is possible to use the same method for fd detection section 206 in Embodiment 1. The detected fd is notified to correction section 602.

Correction section 602 corrects the command demodulated by command demodulation section 103 (that is, modulation method notified from the communication terminal apparatus) based on the detected fd. More specifically, in the case of a high fd, even if the modulation method notified from the communication terminal apparatus is 16 QAM, a modulation method whose transmission rate is one step lower than 16 QAM is set as the modulation method applicable to transmission data for this communication terminal apparatus. It is also possible to set a modulation method two or more steps lower than the modulation method notified from the communication terminal apparatus according to the magnitude of fd. The modulation method set by correction section 602 is notified to adaptive modulation section 603.

Adaptive-modulation section 603 performs adaptive modulation on transmission data to be sent to the communication terminal apparatus using the modulation method set by correction section 602. The transmission data subjected to adaptive modulation is output to transmission RF section 105 as explained in Embodiment 1.

After this, at the communication terminal apparatus shown in FIG. 9, adaptive demodulation section 702 performs demodulation processing on the received signal subjected to radio reception processing by reception RF section 202 according to the demodulation method corresponding to the modulation method used by adaptive modulation section 603 at the base station apparatus shown in FIG. 8. Received data is obtained in this way.

Thus, according to this embodiment, the base station apparatus detects a Doppler frequency using a signal transmitted from the communication terminal apparatus, changes the modulation method (candidate) (to a modulation method with a lower transmission rate) decided by the communication terminal apparatus solely based on the reception quality of pilot signals according to the detected Doppler frequency and sends transmission data to which the changed modulation method is applied to the communication terminal apparatus. That is, the base station apparatus estimates a characteristic difference between pilot signals and received data at the communication terminal apparatus using the detected Doppler frequency and decides the modulation method to be applied to transmission data for the communication terminal apparatus taking this estimated difference into account.

This makes it possible to reliably decide a modulation method which is fastest and at the same time allows the quality of received data at the communication terminal apparatus to satisfy desired quality, thereby allowing high quality and highly efficient data communications. Furthermore, this eliminates the need for a circuit to calculate a Doppler frequency at the communication terminal apparatus and thereby simplifies the circuit configuration of the communication terminal apparatus. As a result, it is possible to reduce power consumption at the communication terminal apparatus and reduce the size of the communication terminal apparatus.

Embodiment 1 above has described the case where the communication terminal apparatus detects fd using two pilot signals which are time-multiplexed with the transmission data and sent by the base station apparatus. However, the communication terminal apparatus can also detect fd using any signals (may also be signals other than pilot signals) sent by the base station apparatus. For example, the communication terminal apparatus can also detect fd using pilot signals (one or a plurality of pilot signals) code-multiplexed or time-multiplexed with the transmission data by the base station apparatus.

Likewise, Embodiment 2 has described the case where the base station apparatus detects fd using a signal sent from the communication terminal apparatus, but the base station apparatus can also detect fd using any signals code-multiplexed or time-multiplexed with the transmission data., etc. by the communication terminal apparatus.

As is apparent from the above-described explanations, the present invention decides a modulation method to be applied to information signals based on the reception quality of a known reference signal and a Doppler frequency, and can thereby provide a communication terminal apparatus capable of maintaining good reception quality even in a fading environment.

This application is based on the Japanese Patent Application No. 2000-225171 filed on Jul. 26, 2000, entire content of which is expressly incorporated by reference herein.

INDUSTRIAL APPLICABILITY

The present invention is ideally applicable to a digital mobile unit communication system.

What is claimed is:

1. A communication terminal apparatus comprising:
   a receiver that receives a radio signal including a pilot section and a data section from a base station apparatus;
   a reception quality detector that detects a reception quality of the pilot section;
   a selector that selects a modulation method applicable to the data section based on a scale of the detected reception quality in comparison to a threshold for said reception quality;
   a transmitter that transmits a command to request the selected modulation method to the base station apparatus; and
   a Doppler frequency detector that detects a Doppler frequency from the pilot section,
   wherein said selector changes said threshold in accordance with the detected Doppler frequency, taking into account a characteristic difference that arises from fading between the pilot section and the data section.

2. A base station apparatus comprising:
   a receiver that receives a radio signal including a pilot section and a data section from a communication terminal apparatus;
   a detector that detects a Doppler frequency from the pilot section;
   a changer that changes a modulation method requested by the communication terminal apparatus with another modulation method in accordance with the detected Doppler frequency, taking into account a characteristic difference that arises from fading between the pilot section and the data section;
   a modulator that modulates a radio signal by said another modulation method;
   a transmitter that transmits the modulated signal to the communication terminal apparatus.

* * * * *